United States Patent
Pinkos et al.

(10) Patent No.: US 6,351,994 B1
(45) Date of Patent: Mar. 5, 2002

(54) SENSOR SYSTEM FOR DETERMINING RELATIVE DISPLACEMENT OF AN OBJECT USING AN ACTIVATION MEMBER

(75) Inventors: Andrew F. Pinkos, Clarkston; John P. Bunge, Farmington Hills, both of MI (US)

(73) Assignee: Trilogy Technologies, Inc., Auburn Hills, MI (US)

( * ) Notice: Subject to any disclaimer, the term of this patent is extended or adjusted under 35 U.S.C. 154(b) by 0 days.

(21) Appl. No.: 09/590,835

(22) Filed: Jun. 9, 2000

(51) Int. Cl.$^7$ .................................................. G01V 8/00
(52) U.S. Cl. ................................. 73/432.1; 250/559.29
(58) Field of Search .............................. 73/432.1, 490; 280/735; 137/291; 250/559.29

(56) References Cited

U.S. PATENT DOCUMENTS

| | | | |
|---|---|---|---|
| 3,526,890 A | | 9/1970 | Malina et al. |
| 3,749,203 A | * | 7/1973 | Hoelscher .................. 187/29 R |
| 3,786,929 A | * | 1/1974 | Hathcock, Jr. .......... 214/16.4 A |
| 3,815,711 A | * | 6/1974 | Hoelscher .................. 187/29 R |
| 4,110,610 A | | 8/1978 | Mueller et al. |
| 4,245,721 A | * | 1/1981 | Masel ...................... 187/29 R |
| 4,270,046 A | | 5/1981 | Werking ..................... 250/205 |
| 4,346,788 A | * | 8/1982 | Shung ...................... 187/29 R |
| 4,362,224 A | * | 12/1982 | Fairbrother ............... 187/29 R |
| 4,494,628 A | * | 1/1985 | Uherek et al. ............. 187/29 R |
| 4,625,329 A | | 11/1986 | Ishikawa et al. ................ 382/1 |
| 4,682,088 A | | 7/1987 | Sullivan ..................... 318/568 |
| 4,765,063 A | | 8/1988 | Sing |
| 4,812,838 A | | 3/1989 | Tashiro et al. .......... 340/825.06 |
| 4,845,415 A | * | 7/1989 | Steely ..................... 318/568.1 |
| 4,909,560 A | | 3/1990 | Ginn |
| 4,920,338 A | | 4/1990 | Tsunoda et al. ......... 340/825.3 |
| 5,037,206 A | | 8/1991 | Etzkorn et al. |
| 5,074,583 A | | 12/1991 | Fujita et al. |
| 5,078,333 A | | 1/1992 | Hester |
| 5,130,529 A | | 7/1992 | Muro |
| 5,286,972 A | | 2/1994 | Falk et al. |
| 5,475,592 A | | 12/1995 | Wnuk et al. ........... 364/424.05 |
| 5,481,078 A | * | 1/1996 | Asche ....................... 200/85 A |
| 5,483,853 A | | 1/1996 | Moradell et al. ....... 74/665 GO |
| 5,497,326 A | | 3/1996 | Berland et al. ........ 364/424.05 |
| 5,520,062 A | * | 5/1996 | Watanabe et al. .......... 73/866.5 |
| 5,653,462 A | | 8/1997 | Breed et al. |
| 5,751,129 A | * | 5/1998 | Vergin ........................ 318/467 |
| 5,803,491 A | * | 9/1998 | Barnes et al. ................ 280/735 |
| 5,808,374 A | | 9/1998 | Miller et al. ................ 307/10.1 |
| 5,810,606 A | * | 9/1998 | Ballast et al. .................. 439/15 |
| 5,847,694 A | | 12/1998 | Redford et al. |
| 5,848,671 A | * | 12/1998 | Kattainen ................... 187/291 |
| 5,848,802 A | | 12/1998 | Breed et al. |
| 5,893,582 A | | 4/1999 | Allen et al. |
| 5,967,549 A | * | 10/1999 | Allen et al. ................. 280/735 |
| 5,967,594 A | | 10/1999 | Ramanujam |

(List continued on next page.)

FOREIGN PATENT DOCUMENTS

| | | |
|---|---|---|
| DE | 3019190 | 11/1981 |
| JP | 0082901 | 5/1985 |

*Primary Examiner*—Hezron Williams
*Assistant Examiner*—C D Garber
(74) *Attorney, Agent, or Firm*—Brooks & Kushman P.C.

(57) ABSTRACT

A sensor system for determining a relative position of a vehicle seat is disclosed. The sensor system has a sensing element and receiver element affixed to the vehicle seat. An enabler is disposed adjacent the vehicle floor. The enabler has at least one activation zone for causing the sensing element to communicate with the at least one receiver element and at least one deactivation zone is provided for preventing the sensing element from communicating with the at least one receiver element. The at least one activation zone defines at least one position of the vehicle seat and the at least one deactivation zone defines at least one other position of the vehicle seat.

2 Claims, 5 Drawing Sheets

U.S. PATENT DOCUMENTS

| | | | |
|---|---|---|---|
| 6,053,529 A | * 4/2000 | Frusti et al. | 280/735 |
| 6,082,498 A | * 7/2000 | Coste et al. | 187/291 |
| 6,095,555 A | * 8/2000 | Becker et al. | 280/735 |
| 6,113,139 A | * 9/2000 | Heximer et al. | 280/735 |
| 6,116,638 A | 9/2000 | Hosoda | |
| 6,142,513 A | 11/2000 | Schoos et al. | |
| 6,151,540 A | 11/2000 | Auishetty | |
| 6,170,866 B1 | 1/2001 | Popp et al. | |
| 6,175,414 B1 | 1/2001 | Holzapfel et al. | |

* cited by examiner

SENSOR SYSTEM FOR DETERMINING RELATIVE DISPLACEMENT OF AN OBJECT USING AN ACTIVATION MEMBER

TECHNICAL FIELD

The present invention relates to sensors for determining an objects position relative to a reference structure.

BACKGROUND ART

Advanced safety restraint systems such as inflatable air bags and pyrotechnic seatbelt restraint systems are in wide spread use in vehicles today. Generally, these advanced restraint systems deploy during a serious vehicle collision, preventing the vehicle occupants from colliding with the vehicle's interior.

Typically, air bag systems are comprised of vehicle crash sensors which detect a vehicle collision, air bag inflators which inflate the air bag, and an air bag cushion which receives a vehicle occupant. Typically, advanced seat belt restraint systems are comprised of pyrotechnic retractors. The pyrotechnic retractors quickly retract the seat belt webbing using an explosive charge, as well known in the art. Other seat belt components such as load limits prevent excessive loading on the occupants chest by releasing tension on the seat belt webbing.

Although these vehicle restraint systems have significantly reduced vehicle occupant injuries problems still exist. For example, when vehicle occupants are "out of position" that is too close to a deploying air bag the vehicle restraint systems are not as effective at reducing occupant injuries. More advanced inflatable restrain systems are available which decrease air bag inflation forces when vehicle occupants are determined to be too close to the inflating air bag. However, occupant positioning sensors that measure an occupant's proximity to an inflating air bag are expensive to implement and have questionable accuracy.

Therefore, what is needed is low cost sensing system for estimating vehicle occupant proximity to an inflatable restraint system for modifying the inflatable restraint system in accordance with occupant position.

DISCLOSURE OF INVENTION

Accordingly, a sensor system for determining a relative position of a vehicle seat, wherein the vehicle seat is fixed to a vehicle floor by a seat track, and the seat track has an upper seat track portion connected to the vehicle seat and a seat track lower portion connected to a vehicle floor, is provided. The sensor system has a sensing element affixed to one of the upper seat tack portion and the lower seat track portion, at lease one receiver element in communication with the sensing element. An enabler is disposed adjacent to the other of the upper seat track and the lower seat track. The enabler has at least one activation zone for causing the sensing element to communicate with the at least one receiver element. At least one deactivation zone is provided for preventing the sensing element from communicating with the at least one receiver element. The at least one activation zone defines at least one position of the vehicle seat and the at least one deactivation zone defines at least one other position of the vehicle seat.

In an embodiment of the present invention a wiper for cleaning the sensing element of debris is provided.

In another embodiment of the present invention the wiper is a resilient material.

In still another embodiment of the present invention the sensing element is an electro-luminescent component.

In still another embodiment of the present invention the electro-luminescent component is a light emitting diode.

In still another embodiment of the present invention the electro-luminescent component is an incandescent light source.

In still another embodiment of the present invention the at least one receiver element is an optical receiver.

In still another embodiment of the present invention the optical receiver is a phototransistor.

In still another embodiment of the present invention the sensing element is a magnet.

In still another embodiment of the present invention the at least one receiver element is a hall effect sensor.

In still another embodiment of the present invention the sensing element is a lever portion of a mechanical switch.

In still another embodiment of the present invention the at least one receiver element is a plunger portion of a mechanical switch.

In still another embodiment of the present invention a sensor housing for holding the sensing element opposite the at least one receiver element is provided.

In still another embodiment of the present invention the sensor housing has at least two downwardly extending side walls.

In still another embodiment of the present invention the sensing element is fixed to one of the at least two side walls and the at least one receiver element is fixed opposite the sensing element to another of the at least two side walls.

In still another embodiment of the present invention the at least two downwardly extending side walls define a longitudinally extending u-channel in the sensor housing.

In still another embodiment of the present invention the at least one activation zone is a longitudinally extending slot.

In still another embodiment of the present invention the at least one deactivation zone is a longitudinally extending opaque area.

In still another embodiment of the present invention the at least one activation zone is a longitudinally extending magnetic material.

In still another embodiment of the present invention the at least one deactivation zone is a longitudinally extending non-magnetic area.

In still another embodiment of the present invention the sensing element is disposed adjacent the at least one receiver element.

In still another embodiment of the present invention a sensor housing having at least one downwardly extending side wall.

In still another embodiment of the present invention the at least one activation zone is a longitudinally extending light reflecting area.

In still another embodiment of the present invention the at least one deactivation zone is a longitudinally extending light non-reflecting area.

In still another embodiment of the present invention the at least one activation zone is a longitudinally extending electrically conductive area.

In still another embodiment of the present invention the at least one deactivation zone is a longitudinally extending non-electrically conductive area.

In yet another embodiment of the present invention a sensor system for measuring a relative position of a vehicle seat, wherein the vehicle seat is fixed to a vehicle floor by a seat track, the seat tack has an upper seat track portion connected to the vehicle seat and a seat track lower portion connected to a vehicle floor. The sensor system includes a sensing element affixed to one of the upper seat tack portion and the lower seat track portion, a plurality of receiver elements are in communication with the sensing element. An enabler is disposed adjacent to the other of the upper seat track and the lower seat track. The enabler has a plurality of activation zones for causing the sensing element to communicate with the plurality of receiver elements, and a plurality of deactivation zones which prevent the sensing element from communicating with the plurality of receiver elements.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Figure 1:
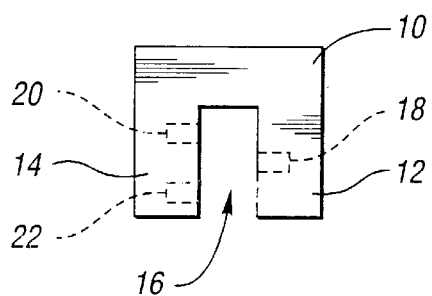
FIG. 1 is a front perspective view of a sensor housing illustrating the position of a sensing element and a pair of receiver elements, in accordance with the present invention.

Referring now to FIG. 1 a sensor housing 10 for use with a sensor system of the present invention for determining an object's position is illustrated. Sensor housing 10, preferably, has a pair of downwardly extending sidewalls 12 and 14. Sidewalls 12 and 14 define a generally U-shaped channel 16.

In an embodiment of the present invention a sensing element 18 is fixed to the inside surface of U-shaped channel 16 and a pair of receiver elements 20 and 22 are disposed opposite the sensing element 18. Sensing element 18 is an optical light source and receivers 20 and 22 are optical receivers which are configured to receive lightwaves emitted from the sensing element 18. For example, sensing element 18 is a electro-luminescent component such as a light emitting diode or an incandescent light bulb. Optical receivers 20 and 22 for example are photo-transistors.

Figure 2:
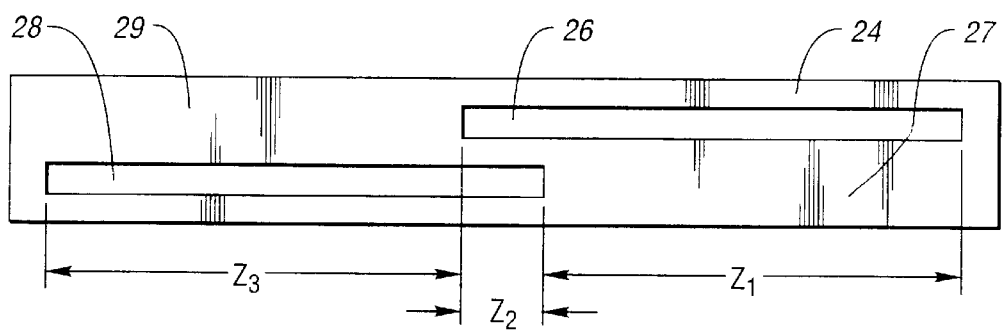
FIG. 2 is a side perspective view of an enabler having a pair of activation slots, in accordance with the present invention.

Referring now to FIG. 2, an enabler 24 for interfering with the light transmitted from sensing 18 is illustrated. The enabler selectively prevents light emitted from sensing 18 from reaching first receiver 20 or second receiver 22. Enabler 24 has a first longitudinal slot 26 and a second longitudinal slot 28 which are in a staggered overlapping relationship. First and second longitudinal slots 26 and 28 create activation areas or zones. For example, three zones are created by this arrangement zone 1, zone 2, and zone 3, as illustrated in FIG. 2. A first deactivation area 27 is disposed adjacent first longitudinal slot 26 and a second deactivation area 29 is disposed adjacent second longitudinal slot 28.

Figure 3:
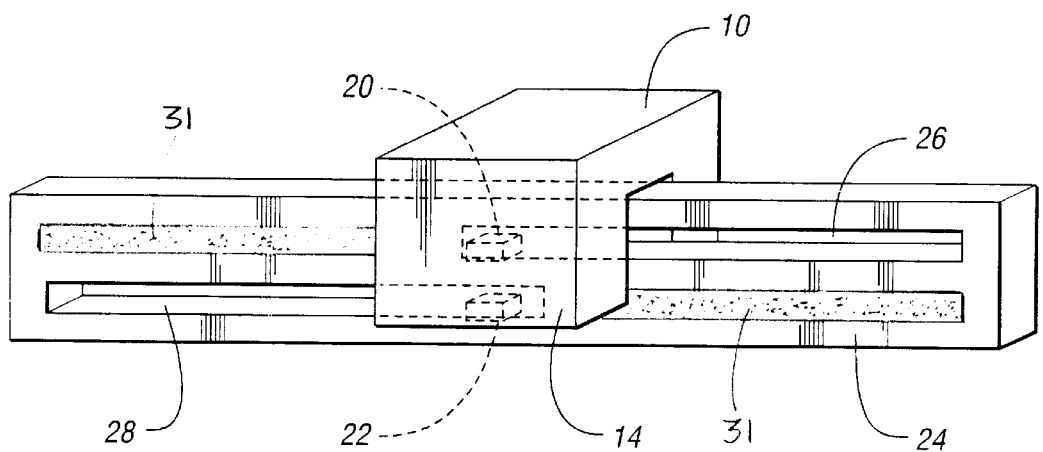
FIG. 3 is a perspective view of the sensor housing positioned in an operative arrangement with the enabler, in accordance with the present invention.

With reference now to FIG. 3, sensor housing 10 is shown in a operative arrangement with enabler 24, in accordance with the present invention. As illustrated in FIG. 3 when sensor housing 10 is generally at a mid-position with respect to enabler 24 both the first and second receivers 20 and 22, are exposed to sensing 18 and thus are activated (receiving light energy). However, when the sensor housing 10 moves left or right along the enabler 24 one of the first receiver 20 and second receiver 22 is blocked from receiving light communicated from sensing 18 and the other is exposed to sensing 18 by first longitudinal slot 26 or by second longitudinal slot 28.

The arrangement shown in FIG. 3 establishes four sensor system outputs, in accordance with the present invention. Table 1 shown below defines the sensor system outputs based on the position of the sensor housing 10 with respect to the enabler 24. The first column lists three possible positions of the sensor housing 10 and one diagnostic condition for the sensor system. The second column lists the output of the first receiver 20 for the different positions and diagnostic condition listed in the first column. Finally, the third column lists the output of the second receiver 22 for the three different positions of the sensor housing 10 and the diagnostic condition shown in the first column. The fault condition is provided to insure proper system operation. If the receiver outputs are both low one or both receivers must be malfunctioning since the enabler could not produce such a condition.

A wiper 31 is disposed within the deactivation areas to clear the sensing element and the receiver elements of debris. Wiper 31 is comprised of a resilient material such as brush bristles or the like.

TABLE 1

| ACTIVATION ZONES & DIAGNOSTIC CONDITION | 1ST RECEIVER OUTPUT VOLTAGE | 2ND RECEIVER OUTPUT VOLTAGE | SEAT POSITION |
| --- | --- | --- | --- |
| Zone 1 | High | Low | Mid to Rear |
| Zone 2 | High | High | Middle |
| Zone 3 | Low | High | Mid to Forward |
| System Fault | Low | Low | N/A |

Figure 4:
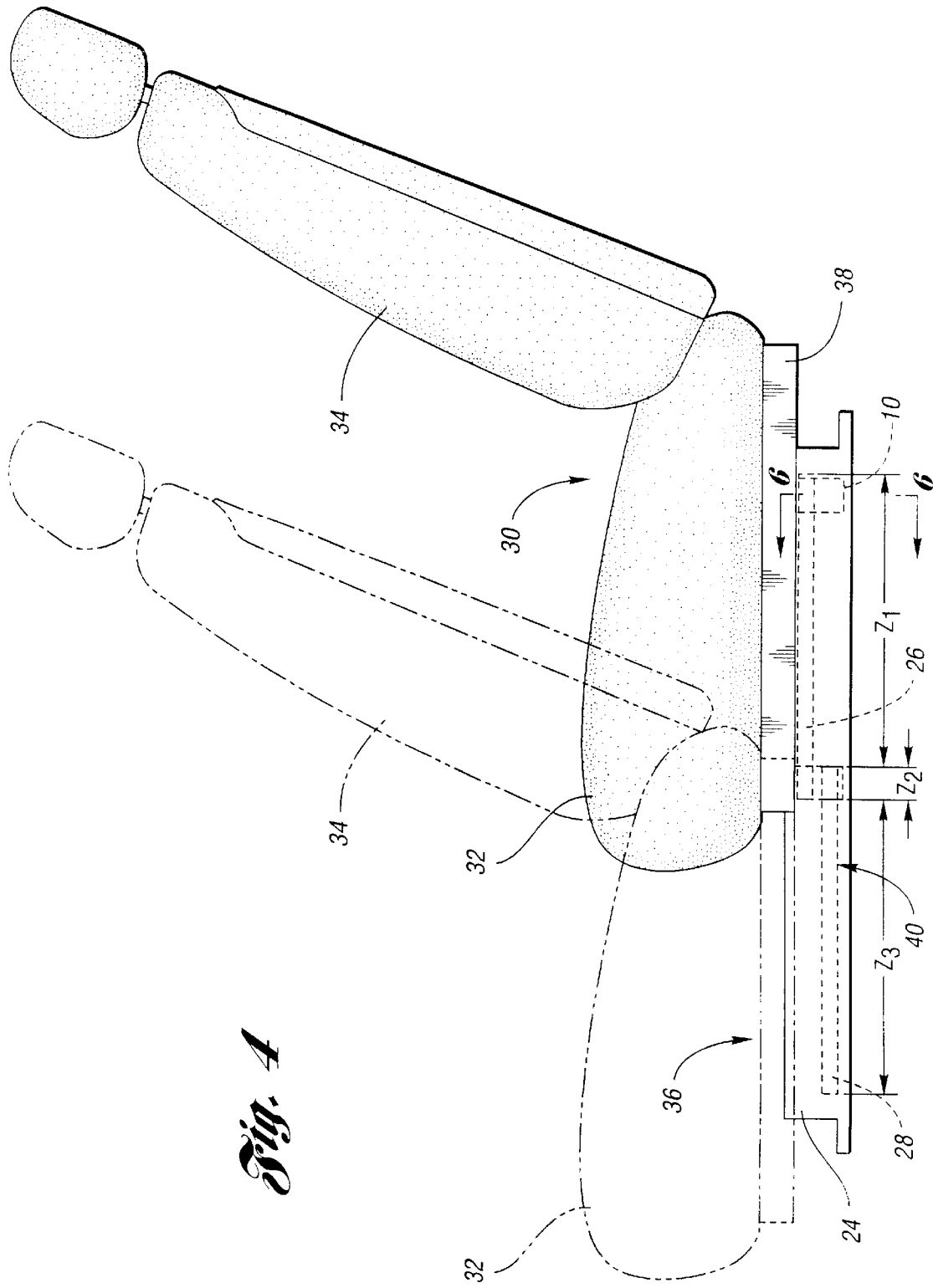
FIG. 4 is a side perspective view of a vehicle seat assembly mounted to a seat tract and having the sensor system of the present invention mounted thereto, in accordance with the present invention.

Accordingly, the position of an object such as a vehicle seat may be determined by mounting sensor housing 10 to the object or vehicle seat and mounting enabler 24 to a fixed reference such as a seat track lower bracket, wherein the seat track lower bracket is fixed to a vehicle floor. FIG. 4 illustrates such an arrangement, wherein a vehicle seat 30 having a seat back 34 and a seat bottom cushion 32 are mounted to a seat track 36. Seat track 36 is comprised of an upper bracket 38 and a lower bracket 40. Seat 30 is rigidly secured to upper bracket 38 as well known in the art. Seat track lower bracket 40 is slidably engaged with seat track upper bracket 38 and rigidly secured to the vehicle floor. Sensor housing 10 is secured to the upper bracket 38 at a mid position, as will be described below. Enabler 24 is mounted to the seat track lower bracket 40 and is received into U-channel 16 of the sensor housing 10 as will also be further described and illustrated below.

With continuing reference to FIG. 4 the relationship between activation zones or slots and seat position is further illustrated. When the vehicle seat is positioned from the midpoint rearward (as shown in solid lines) the sensor housing 10 is within activation zone 1, as described in Table 1 above. The receiver outputs are high for the first receiver 22 and low for the second receiver 20. When sensor housing 10 and thus the seat 30 is positioned at the midpoint position receivers 20 and 22 have a high voltage output level. Finally, the third zone spans from the mid seat track position to the forward end of lower seat track bracket 40. When the sensor housing 10 is positioned within the third zone the vehicle seat is forward of the mid position (as shown in dashed lines and the voltage outputs of the receivers 20 and 22, as illustrated in Table 1 are low and high, respectively.

Figure 5:
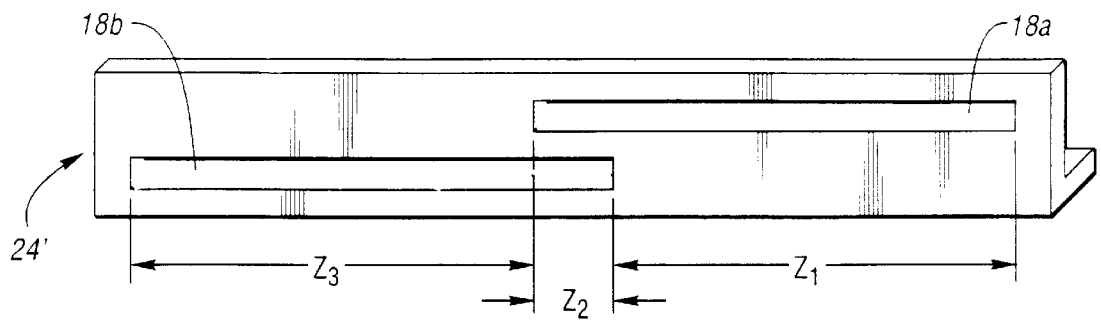
FIG. 5 is a front perspective view of the enabler having sensing elements in the form of magnetic strips affixed to a surface thereof, in accordance with the present invention.

In another embodiment of the present invention an enabler 24' as shown in FIG. 5 is employed. Enabler 24' has the sensing element 18 affixed to a surface opposite the receiver elements 20 and 22. The sensing element is a magnetic strip 18a and 18b or other elongated magnetic material and the receiver elements 20 and 22 are hall effect sensors. Each magnetic strip defines an activation zone wherein the sensor system output transitions when the magnetic strip is disposed opposite the hall effect sensor.

Figure 6A:
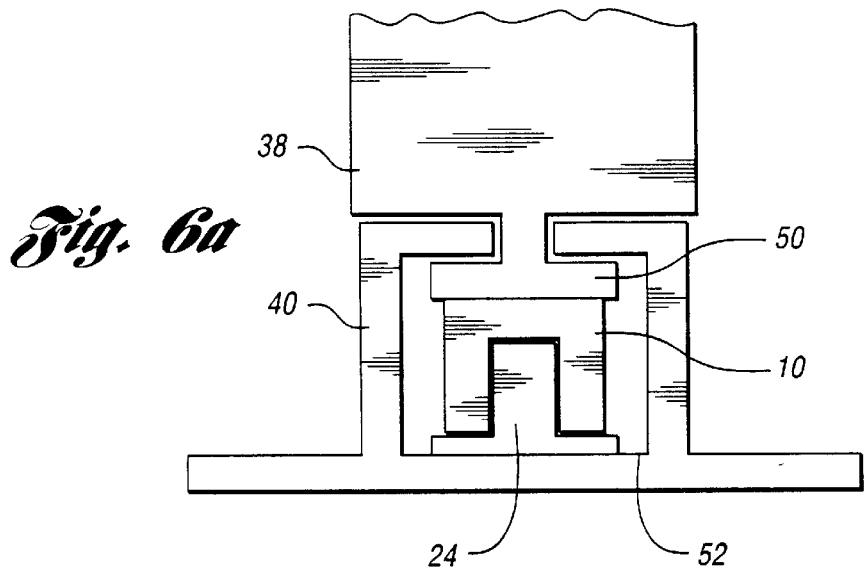
FIG. 6a is a cross-sectional view of the seat track assembly and the attachment of the sensor housing and enabler thereto, in accordance with an embodiment of the present invention.

FIG. 6a is a cross-sectional view of the seat track 40 illustrating an attachment scheme for the sensor housing 10 and the enabler 24, in accordance with the present invention. As illustrated in FIG. 6, sensor housing 10 is fixed to a seat track engagement portion 50 and the enabler is fixed to a bottom surface 52 of seat track lower bracket 40. As seat track upper bracket 38 slides on the seat track lower bracket 40 sensor housing 10 changes position with respect to enabler 24.

Figure 6B:
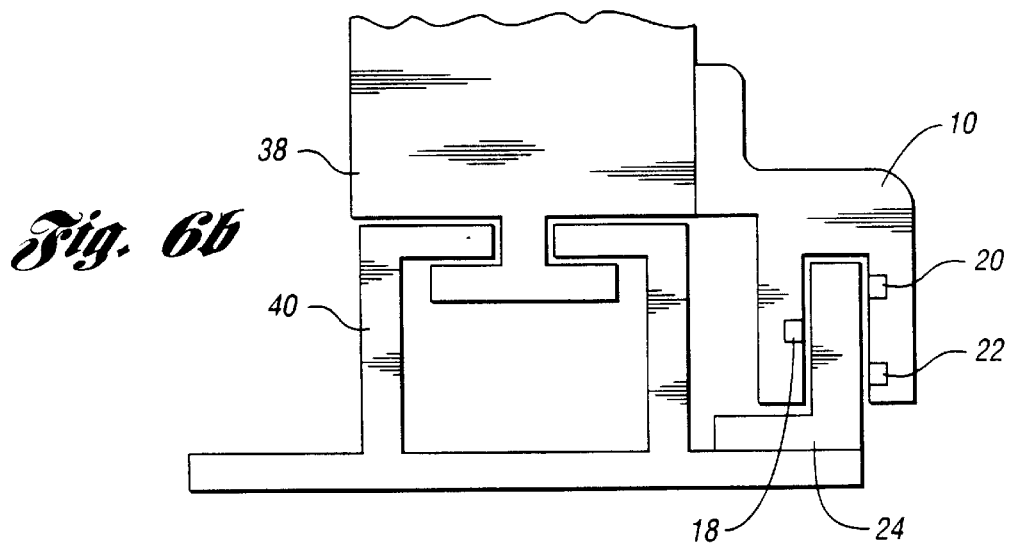
FIG. 6b is a cross-sectional view of the seat track assembly and the attachment of the sensor housing and enabler thereto, in accordance with another embodiment of the present invention.

In an alternative embodiment sensor housing 10 is affixed to a side of the upper seat track 38, as illustrated in cross-section in FIG. 6b. Enabler 24 is securedly attached to the seat track lower bracket 40. Similarly, as described above, as the seat track upper bracket 38 slides over the seat track lower bracket 40 sensor housing 10 moves relative to enabler 24. Seat position is determined, as described in Table 1, by the relative location of the sensor housing with respect to the activation zones on enabler 24.

Figure 6C:
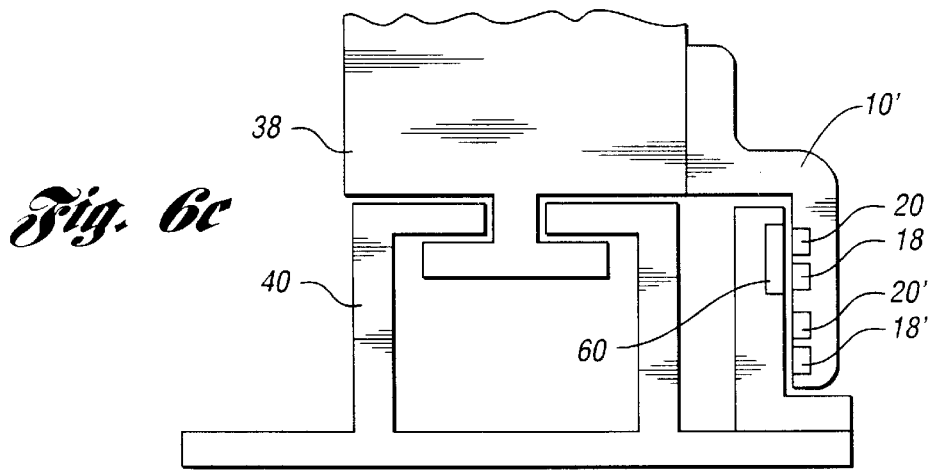
FIG. 6c is a cross-sectional view of the seat track assembly and the attachment of the sensor housing and enabler thereto, in accordance with still another embodiment of the present invention.

Referring now to FIG. 6c, a cross-sectional view of still another embodiment of the present invention is illustrated. A sensor housing 10' is illustrated which is configured to hold sensing element 18 adjacent a receiver element 20. As described above sensing element 18 may be an optical sensor and receiver 20 may be an optical receiver. In this case enabler 24 has an activation zone comprised of a reflective area 60 such as a mirrored surface which reflects lightwaves emitted from the optical sensor back toward the optical receiver. The lightwaves activate optical receiver and cause the sensor system output voltage to transition. Seat position can then be deduced from this voltage transition which corresponds to relative the position of the sensor head 10' with respect to the activation zones on the enabler 24.

Figure 7:
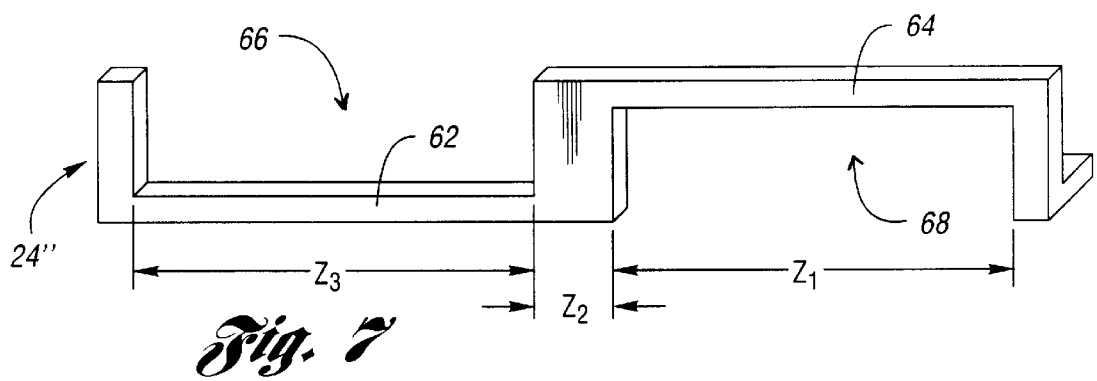
FIG. 7 is a side perspective view of an enabler, in accordance with yet another embodiment of the present invention.

In yet another embodiment a hall effect sensor may be used for the receiver element 20 and a magnet may be used for the sensing element 18 in the arrangement shown in FIG. 6c. In this embodiment an enabler 24" having an S-shape is used. The S-shaped enabler 24" is comprised of a ferrous material. FIG. 7 is a front perspective view of a typical S-shaped enabler 24", in accordance with the present invention. The longitudinally extending ferrous material portions 62 and 64 correspond to the activation zones which cause the sensor system output to transition. The open areas 66 and 68 lack ferrous material and therefore are the deactivation zones.

Figure 8A:
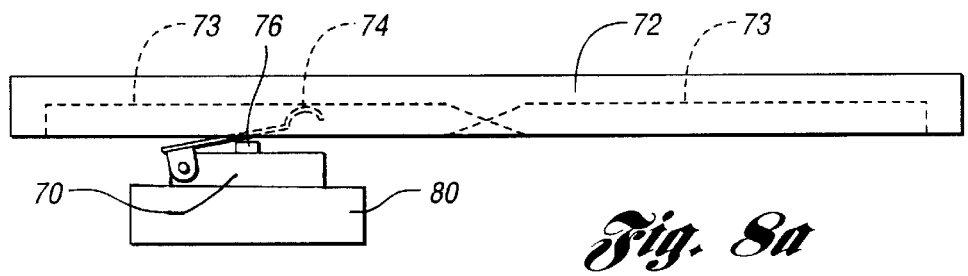
FIG. 8a is a top perspective view of the mechanical switch and grooved enabler arrangement, in accordance with still another embodiment of the present invention.
Figure 8B:
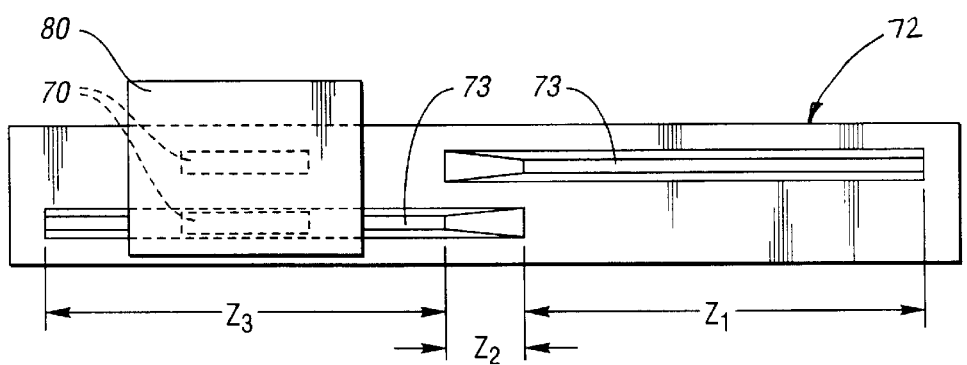
FIG. 8b is a front perspective view of the mechanical switch and grooved enabler arrangement, in accordance with the present invention.

In still another embodiment of the present invention a mechanical switch 70 and enabler 72 wherein the enabler has ramped slots or grooves 73 are used to determine seat location, as illustrated in FIGS. 8a and 8b. The mechanical switch 70 has a lever portion or arm 74 which acts as a sensing element and a plunger or button 76 which acts as a receiver element. As the sensor housing 80 moves with respect to the enabler 72 lever arm 74 moves in and out of the groove or slot 73. Seat position is determined by the relative position of the sensor housing 80 with respect to the activation zones or groves 73 of the enabler 72. As illustrated in FIG. 8b two switches are used to obtain the sensor system outputs shown in Table 1 above.

Of course other mechanical switches may be used in place of the switch 70 described above. For example, enabler 72 could include a pair of electrically conductive surfaces or strips in place of grooves 73 wherein the conductive strips contact and short across a pair of switch terminals.

Figure 9A:
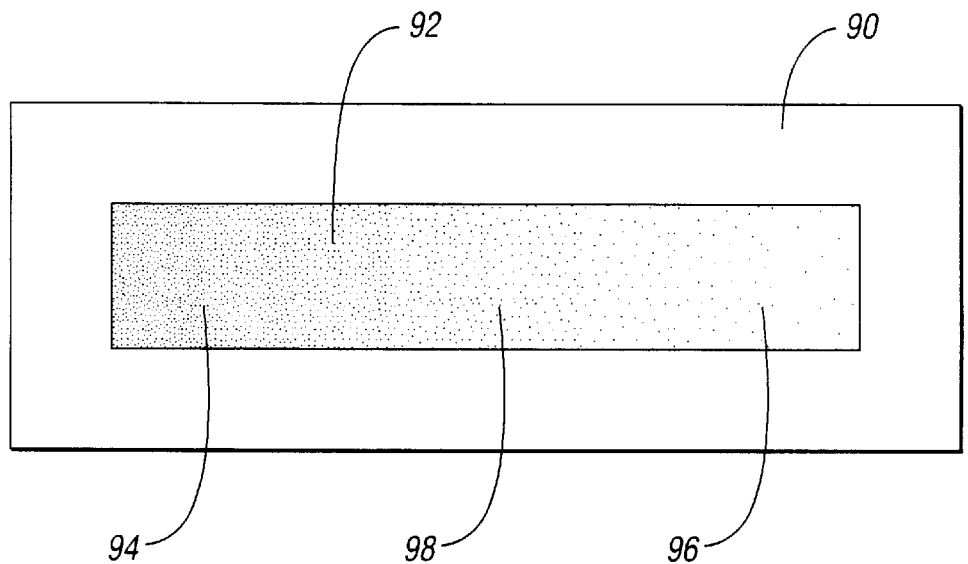
FIG. 9a is a perspective view of an alternative shield configured to cooperate with an emitter and receiver arrangement wherein the emitter is disposed adjacent the receiver, in accordance with the present invention.

Referring now to FIG. 9a, an alternative enabler 90 design is illustrated, in accordance with the present invention. Enabler 90 is configured to cooperate with an emitter and receiver arrangement wherein the emitter is disposed adjacent the receiver. In this embodiment, enabler 90 has a plurality of reflective particles disposed in a longitudinally extending area 92. The concentration of reflective particles varies from a high concentration at a high reflection end 94 to low concentration at a low reflection end 96. For example, high reflection end 92 may have 100% concentration of reflective particles (forming a mirrored surface) and low reflection end 96 may have 0% concentration of reflective particles (forming an opaque surface). Accordingly, the area between the high reflection end 92 and low reflection end 96 will gradually change in concentration of reflective particles, for example, a middle area 98 of longitudinally extending area 92 will have approximately a 50% concentration of reflective particles. The present invention contemplates the use of non-reflective particles for depositing over the longitudinally extending area 92, wherein area 92 has a reflective surface, to achieve a similar result as described above.

Figure 9B:
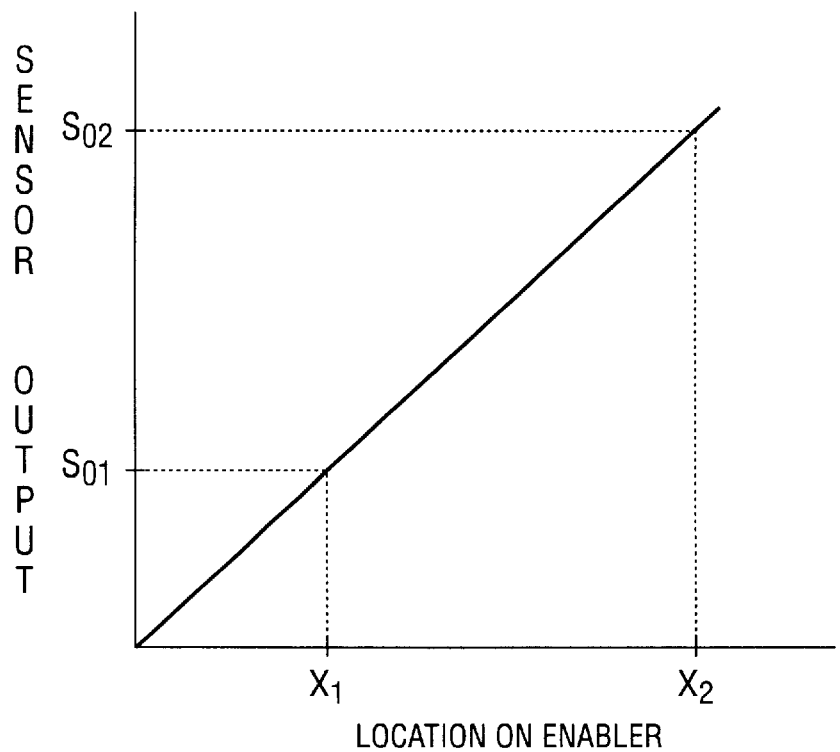
FIG. 9b is a chart illustrating the voltage output versus position of a sensor system having a varying reflective portion, in accordance with the present invention.

In FIG. 9*b* a typical sensor system signal output curve corresponding to a sensor system using enabler 90 is illustrated. As shown the signal output varies linearly with the position of the sensor with respect to an end of enabler 90. The sensor system signal output is a voltage or a current which is indicative of sensor housing's 10 position with respect to an end of enabler 90. For example, X1 denotes a location on enabler 90 having a low concentration of reflective particles and X2 corresponds to a location on enabler 90 having a high concentration of reflective particles. Accordingly, the voltage output corresponding to position X1 is S01 and for X2 the corresponding voltage is S02. The sensor system of the present invention provides an analog voltage output over the full range of movement of the object (vehicle seat) being monitored thus, the present embodiment provides a sensor system having greater precision than other embodiments where only discrete movements of the object are sensed. Of course, the present invention contemplates varying the concentration of reflective particles across area 92 to create a non-linear distribution of particles, as well as creating different particle distribution shapes or patterns. Accordingly, the sensor system output would correspond to the distribution of reflective or non-reflective particles creating a linear or non-linear relationship between sensor system output and location of sensor housing 10 on enabler 90.

As readily apparent from the above disclosure the present invention has many advantages and benefits over the prior art. For example the sensor system of the present invention provides a low cost system for determining vehicle seat position. Moreover, multiple sensing elements are used to detect a plurality of seat locations and provide fault detection.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sensor system for determining a relative position of a vehicle seat, wherein the vehicle seat is fixed to a vehicle floor by a seat track, the seat track having an upper seat track portion connected to the vehicle seat and a lower seat track portion connected to a vehicle floor, the sensor system comprising:

a sensor housing having at least one downwardly extending side wall;

a sensing element affixed to one of the upper seat track portion and the lower seat track portion;

at least one receiver element in selective communication with the sensing element, wherein the sensing element is disposed adjacent the at least one receiver element; and an enabler disposed adjacent to the other of the upper seat track portion and the lower seat track portion, the enabler having at least one activation zone for allowing the sensing element to communicate with the at least one receiver element, and at least one deactivation zone for preventing the sensing element from communicating with the at least one receiver element, the at least one activation zone defining at least one position of the vehicle seat and the at least one de activation zone defining at least one other position of the vehicle seat, wherein the at least one activation zone is a longitudinally extending light reflecting area having a varying concentration of reflective particles.

2. A sensor system for determining a relative position of a vehicle seat, wherein the vehicle seat is fixed to a vehicle floor by a seat track, the seat track has an upper seat track portion connected to the vehicle seat and a lower seat track portion connected to a vehicle floor, the sensor system comprising:

a sensor housing having at least one downwardly extending side wall;

a sensing element affixed to one of the upper seat track portion and the lower seat track portion;

at least one receiver element in selective communication with the sensing element, wherein the sensing element is disposed adjacent the at least one receiver element; and an enabler disposed adjacent to the other of the upper seat track portion and the lower seat track portion, the enabler having at least one activation zone for allowing the sensing element to communicate with the at least one receiver element, and at least one deactivation zone for preventing the sensing element from communicating with the at least one receiver element, the at least one activation zone defining at least one position of the vehicle seat and the at least one deactivation zone defining at least one other position of the vehicle seat, wherein the at least one activation zone is a longitudinally extending light reflecting area having a varying concentration of reflective particles and the varying concentration of reflective particles produces an analog sensor output signal indicative of a movement of the vehicle seat.

* * * * *